(12) United States Patent
Ash et al.

(10) Patent No.: US 11,434,161 B2
(45) Date of Patent: Sep. 6, 2022

(54) METHOD OF FORMING A GLASS ARTICLE AND THE GLASS ARTICLE FORMED THEREBY

(71) Applicant: PILKINGTON GROUP LIMITED, Lathom (GB)

(72) Inventors: Charles E. Ash, Canton, OH (US); Robert J. Boisselle, Maumee, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 16/610,175

(22) PCT Filed: May 4, 2018

(86) PCT No.: PCT/GB2018/051211
§ 371 (c)(1),
(2) Date: Nov. 1, 2019

(87) PCT Pub. No.: WO2018/203085
PCT Pub. Date: Nov. 8, 2018

(65) Prior Publication Data
US 2021/0087097 A1     Mar. 25, 2021

Related U.S. Application Data

(60) Provisional application No. 62/501,432, filed on May 4, 2017.

(51) Int. Cl.
*C03B 23/03* (2006.01)
*C03B 23/035* (2006.01)
(Continued)

(52) U.S. Cl.
CPC .......... *C03B 23/0307* (2013.01); *B32B 17/06* (2013.01); *B32B 38/0012* (2013.01);
(Continued)

(58) Field of Classification Search
None
See application file for complete search history.

(56) References Cited

U.S. PATENT DOCUMENTS 4,043,784 A * 8/1977 Reese ................. C03B 23/0252
65/107
4,786,784 A 11/1988 Nikodem et al.
(Continued)

FOREIGN PATENT DOCUMENTS

CN    106458684 A    2/2017
JP    H5318615 A    3/1993
(Continued)

OTHER PUBLICATIONS

European Patent Office, International Search Report with Written Opinion issued in PCT/GB2018/051211, dated Jul. 20, 2018, 12 pages, European Patent Office, Rijswijk, Netherlands.

*Primary Examiner* — Lisa L Herring
(74) *Attorney, Agent, or Firm* — Marshall & Melhorn, LLC

(57) ABSTRACT

A method of forming a glass article includes providing a first glass sheet. The first glass sheet is heated to a temperature suitable for shaping. The first glass sheet is deposited on a first bending tool. An edge portion of the first glass sheet is disposed over a shaping surface of the first bending tool. The shaping surface of the first bending tool is configured to provide in the first glass sheet a compression area and a tension area. The first glass sheet is shaped on the first bending tool and the compression area is formed in the edge portion of the first glass sheet. The compression area includes a first portion and a second portion. The first portion has a width which is greater than a width of a second portion.

10 Claims, 10 Drawing Sheets

(51) Int. Cl.
     *C03B 40/00*      (2006.01)
     *B32B 17/06*      (2006.01)
     *B32B 38/00*      (2006.01)

(52) U.S. Cl.
     CPC ........ *B32B 38/0036* (2013.01); *C03B 23/035* (2013.01); *B32B 2315/08* (2013.01); *C03B 40/005* (2013.01); *C03B 2225/02* (2013.01)

(56) References Cited

U.S. PATENT DOCUMENTS

| | | | |
|---|---|---|---|
| 5,591,245 | A | 1/1997 | Salonen |
| 5,679,124 | A | 10/1997 | Schnabel, Jr. et al. |
| 5,865,866 | A | 2/1999 | Schnabel, Jr. et al. |
| 6,015,619 | A | 7/2000 | Schnabel, Jr. et al. |
| 2013/0062120 | A1* | 3/2013 | Galonska ................ H01R 4/02 174/84 R |

FOREIGN PATENT DOCUMENTS

| | | |
|---|---|---|
| JP | 2002068786 A | 3/2002 |
| JP | 2014051417 A | 3/2014 |
| WO | 2004052055 A1 | 6/2004 |

* cited by examiner

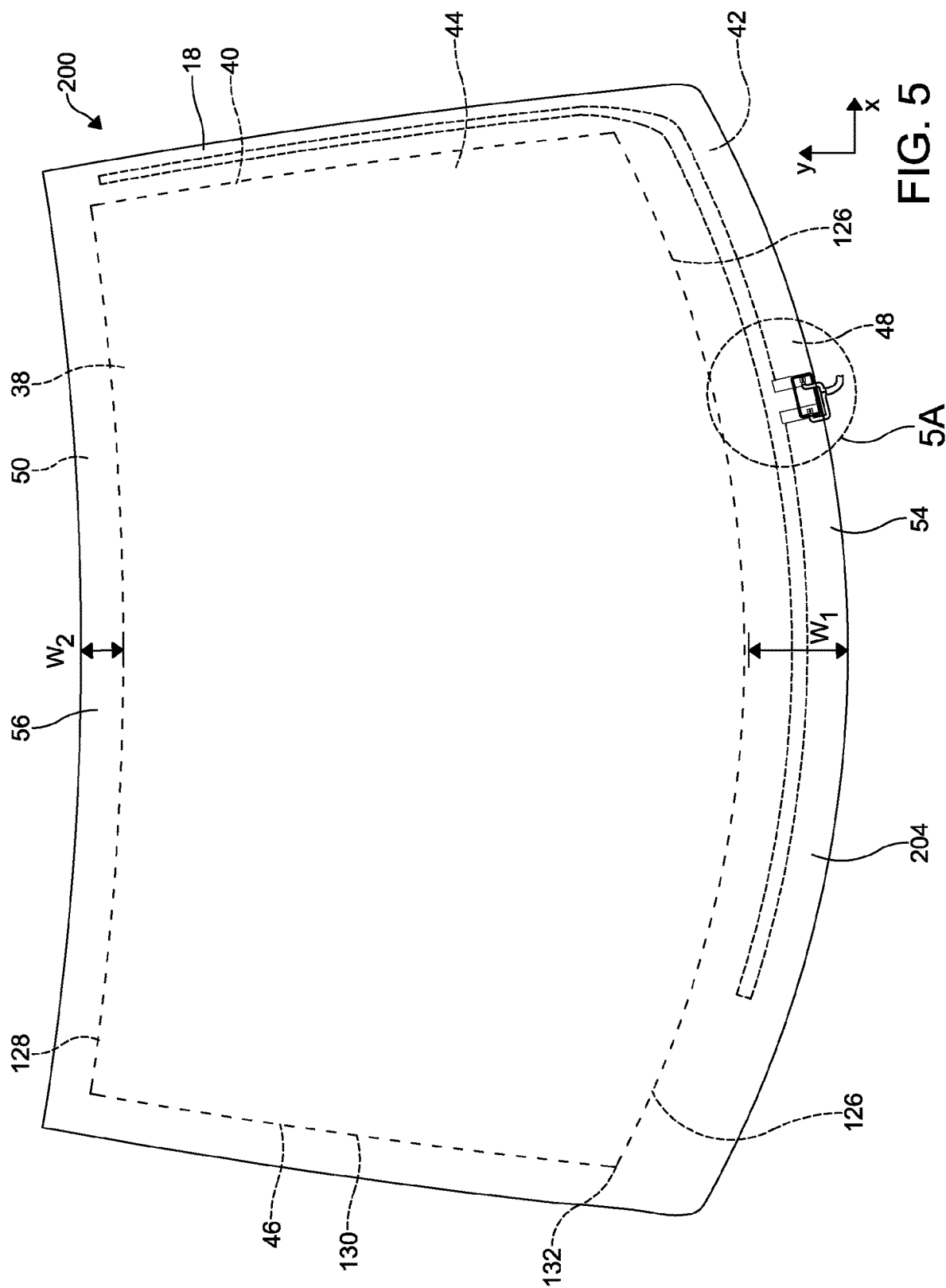

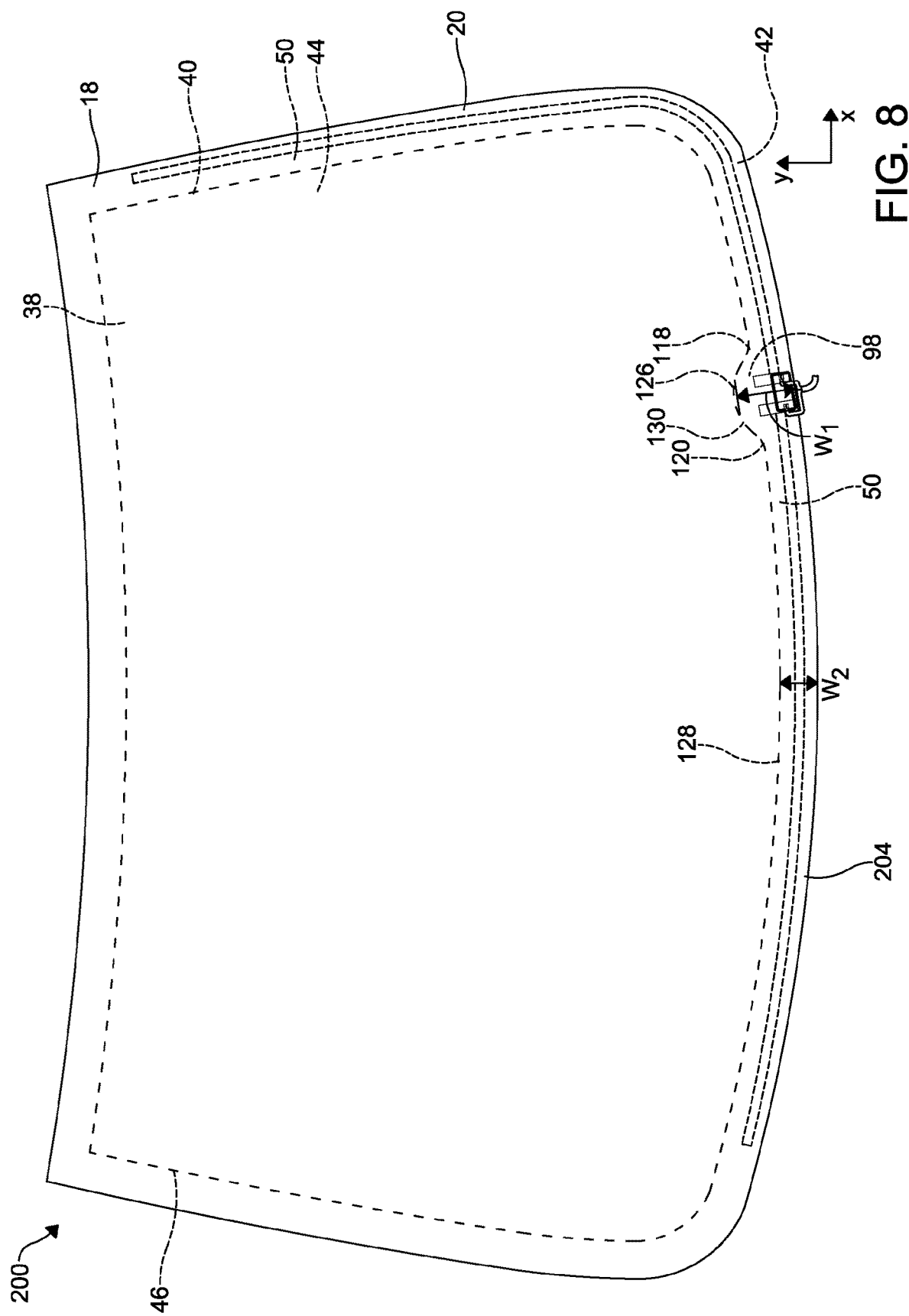

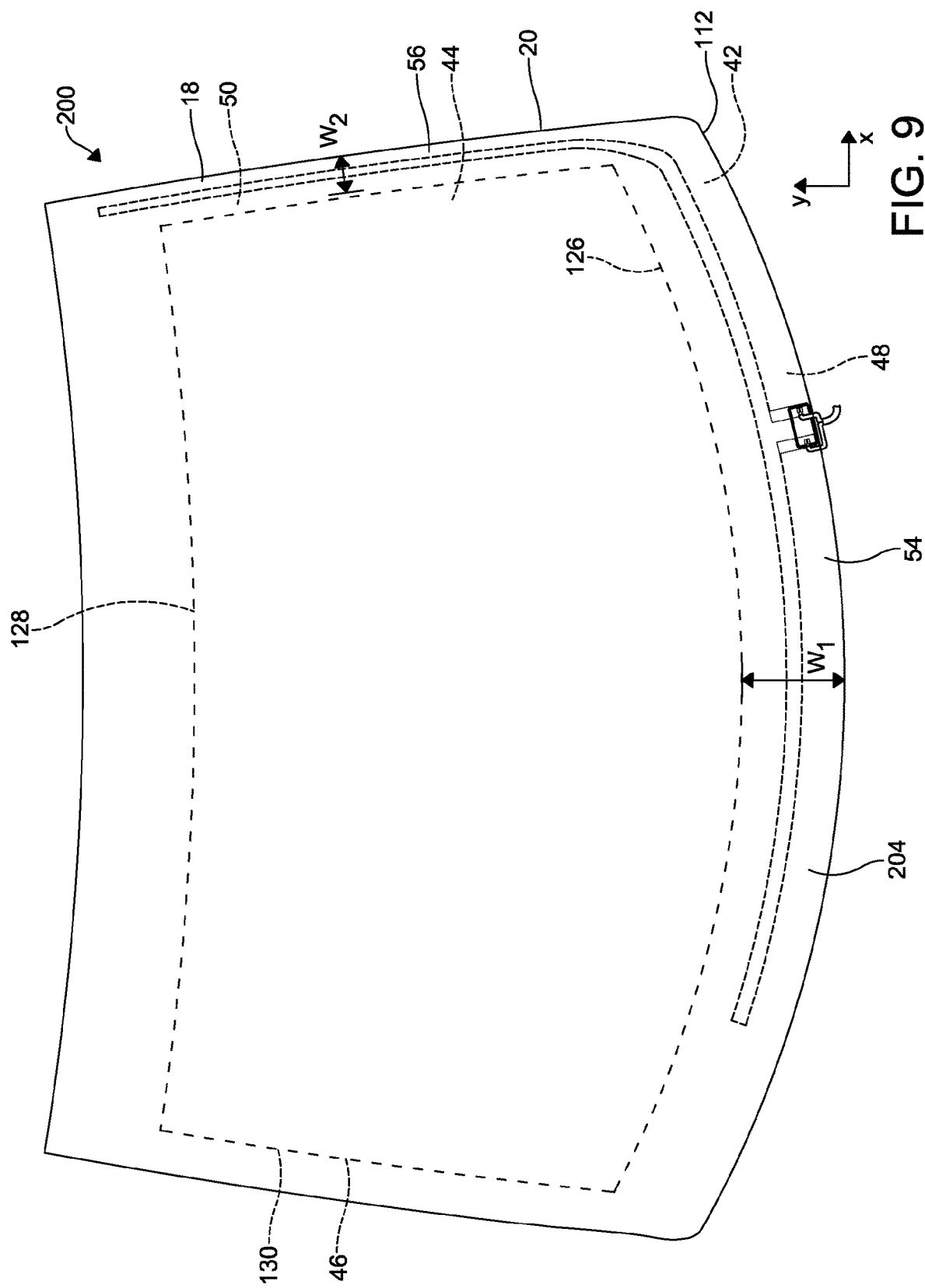

METHOD OF FORMING A GLASS ARTICLE AND THE GLASS ARTICLE FORMED THEREBY

CROSS-REFERENCE TO RELATED APPLICATION

This application is claiming the benefit, under 35 U.S.C. 119(e), of the provisional U.S. patent application which was granted Ser. No. 62/501,432 and filed on May 4, 2017, the entire disclosure of which is hereby incorporated by reference.

BACKGROUND

The invention also relates to a method of forming a glass article. The invention also relates to the glass article that is formed by the method.

Various processes are known for shaping or bending a sheet of glass. Typically, a glass sheet is heated to a temperature where the glass sheet is deformable and then the bending process is carried out. In certain bending processes, the heated glass sheet is supported on a ring member and allowed to sag under the influence of gravity, with or without the assistance of an additional pressing force. Another known glass sheet bending process is a press bending process whereby a glass sheet (or a nested pair) is bent between a pair of complementary shaping members, usually in a spaced vertical relationship.

After being shaped, electronic equipment and/or other devices may be disposed on the glass sheet. Typically, electricity must be reliably supplied to the equipment and devices to power the aforementioned items. Wire assemblies are often used to supply the electricity. However, attaching certain portions of the wire assembly to the glass sheet can cause damage to the glass sheet. If the glass sheet is included in a windshield, the damage can lead to a windshield failure or failure of the items disposed thereon. Thus, it would be desirable to provide a glass sheet that may be used in a windshield or another glazing that is not damaged by attaching a wire assembly or another member utilized to supply power thereto.

BRIEF SUMMARY

Embodiments of a method of forming a glass article are provided. In an embodiment, the method comprises providing a first glass sheet. The first glass sheet is heated to a temperature suitable for shaping. The first glass sheet is deposited on a first bending tool. An edge portion of the first glass sheet is disposed over a shaping surface of the first bending tool. The shaping surface of the first bending tool is configured to provide in the first glass sheet a compression area and a tension area. The first glass sheet is shaped on the first bending tool and the compression area is formed in the edge portion 18 of the first glass sheet. The compression area comprises a first portion and a second portion. The first portion has a width which is greater than a width of a second portion.

Preferably, the tension area is formed in a second portion of the first glass sheet which is located inward of the edge portion of the first glass sheet and a transition is formed in a third portion of the first glass sheet.

Preferably, the compression area surrounds the tension area and a transition formed in the first glass sheet.

Preferably, the method further comprises positioning an electrical component over the first portion of the compression area and providing the electrical component in mechanical communication with the first glass sheet via a soldering process.

Preferably, the shaping surface of the first bending tool is configured to provide in the first glass sheet a transition between the compression area and the tension area.

Preferably, the edge portion of the first glass sheet comprises a first edge portion and a second edge portion, the first portion of the compression area being formed in the first edge portion and the second portion of the compression area being formed in the second edge portion.

Preferably, the first edge portion is a trailing edge portion and the second edge portion is a leading edge portion.

Preferably, the edge portion of the first glass sheet comprises a first edge portion, the first portion and the second portion of the compression area each being formed in the first edge portion.

Preferably, the method further comprises laminating the first glass sheet to a second glass sheet.

Preferably, the compression area is formed by cooling the edge portion of the first glass sheet via contact between the edge portion of the first glass sheet and the first bending tool.

Preferably, the method further comprises cooling the edge portion of the first glass sheet via contact between the edge portion of the first glass sheet and a second bending tool.

Preferably, the method further comprises forming a transition in a portion of the first glass sheet which is adjacent the edge portion of the first glass sheet, the portion of the first glass sheet being disposed over but not in contact with the first bending tool.

Preferably, the method further comprises forming a transition in a portion of the first glass sheet which is adjacent the edge portion of the first glass sheet, wherein a space separates the portion of the first glass sheet and the first bending tool.

Preferably, the shaping surface of the first bending tool comprises a first segment and an inner end of the first portion of the compression area is adjacent an inner edge of the first segment such that a transition is formed in a portion of the first glass sheet which is located inward of the inner edge of the first segment.

Preferably, the inner end of the first portion of the compression area is aligned with the inner edge of the first segment.

Preferably, the shaping surface of the first bending tool comprises a first segment, the first segment including a first width which is greater than the width of the first portion of the compression area.

Preferably, the width of the first portion of the compression area is greater than a width of a portion of a transition formed in the first glass sheet inward of the first portion of the compression area.

Preferably, the shaping surface of the first bending tool comprises a first segment, the first segment including an upper surface configured to support the first glass sheet.

Preferably, the first portion of the compression area being formed over the upper surface.

Preferably, the upper surface is formed in a unitary manner.

Preferably, the first segment also comprises an outer portion and an inner portion, the outer portion extending from an outer edge to the inner portion and the inner portion extending from the outer portion to an inner edge.

Preferably, the first portion of the compression area is formed over the outer portion and a transition is formed in the first glass sheet over the inner portion.

Preferably, the inner portion gradually reduces in thickness toward the inner edge.

Preferably, the first segment also includes an inner edge, the first portion of the compression area being formed over the upper surface and an inner end of the first portion of the compression area being formed over the inner edge of the first segment.

Also, embodiments of a glass article are provided. In an embodiment, the glass article comprises a first glass sheet. The first glass sheet comprises a compression area and a tension area formed in the first glass sheet. The compression area exhibits a compressive area stress of 20-100 MPa and is formed in an edge portion of the first glass sheet. The compression area comprises a first portion and a second portion. The first portion has a width which is greater than a width of a second portion.

Preferably, the tension area is formed in a second portion of the first glass sheet, the second portion of the first glass sheet is located inward of the edge portion of the first glass sheet, and a transition is formed in the first glass sheet in a third portion of the first glass sheet.

Preferably, the glass article further comprises a first terminal connector positioned over the first portion of the compression area and in mechanical communication with the first glass sheet.

Preferably, a transition in the first glass sheet is inward a first terminal connector in mechanical communication with the first glass sheet.

Preferably, the glass article further comprises a second terminal connector which is in a spaced apart relationship with the first terminal connector.

Preferably, the first terminal connector is in a spaced apart and parallel relationship with a portion of a peripheral edge of the first glass sheet.

Preferably, the edge portion of the first glass sheet comprises a first edge portion and a second edge portion, the first portion of the compression area being formed in the first edge portion and the second portion of the compression area being formed in the second edge portion.

Preferably, the first portion of the compression area is in a spaced apart relationship with the second portion of the compression area.

Preferably, the first portion of the compression area is adjacent the second portion of the compression area.

Preferably, the first portion of the compression area extends from a peripheral edge of the first glass sheet to the second portion of the compression area.

Preferably, a transition from the first portion of the compression area to the second portion of the compression area is sharply defined.

Preferably, a transition in the first glass sheet comprises a curved portion.

Preferably, a transition in the first glass sheet comprises a linear portion.

Preferably, a transition in the first glass sheet comprises a first portion, the first portion extending from the edge portion of the first glass sheet, a second portion provided in a parallel relationship with the first portion, the second portion extending from the edge portion of the first glass sheet, and a third portion connecting the first portion to the second portion.

Preferably, the third portion is provided in a perpendicular relationship with the first portion and the second portion.

Preferably, the edge portion of the first glass sheet comprises a first edge portion, the first portion of the compression area and the second portion of the compression area being formed in the first edge portion.

Preferably, the width of the first portion gradually increases in a direction toward a first end of the first portion.

Preferably, a transition in the first glass sheet exhibits an area stress of 0 MPa and the tension area exhibits a tensile area stress of less than 8 MPa.

Preferably, the glass article further comprises a polymeric interlayer provided between the first glass sheet and a second glass sheet.

Preferably, the first glass sheet is shaped.

Preferably, the shaped first glass sheet is flat or bent.

Preferably, in the first glass sheet a transition is located between a compression area and a tension area.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 5 is a front view of an embodiment of glass article in accordance with the invention;

FIG. 8 is a front view of yet another embodiment of glass article in accordance with the invention; and FIG. 9 is a front view of a further embodiment of glass article in accordance with the invention.

DETAILED DESCRIPTION

Figure 1:
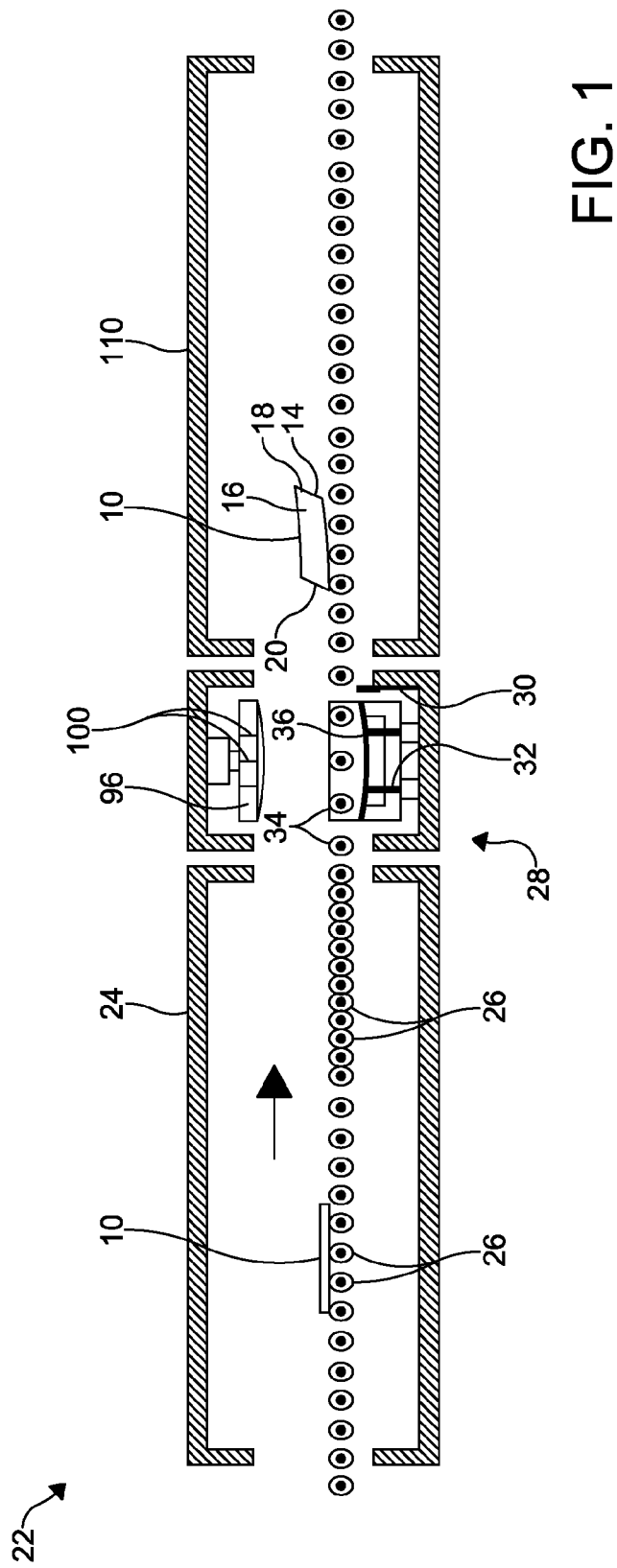
FIG. 1 is a schematic representation of an embodiment of a glass shaping line in accordance with the invention.

It is to be understood that the invention may assume various alternative orientations and step sequences, except where expressly specified to the contrary. It is also to be understood that the specific articles, assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a method of forming a glass article and the glass article formed by the method are described herein and with reference to FIGS. 1-9.

The method comprises providing a first glass sheet 10. In an embodiment, the first glass sheet 10 has a soda-limesilicate composition. A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2% and $Fe_2O_3$ 0.005-2%. In certain embodiments, the first glass sheet 10 may be of a low iron composition. In these embodiments, the first glass sheet 10 may comprise less than 200 parts per million $Fe_2O_3$. The glass composition may also contain other additives, for example, refining aids, which would normally be present in an amount of up to 2%. In other embodiments, the first glass sheet 10 may be of another composition. For example, the first glass sheet 10 may be of a borosilicate composition or an aluminosilicate composition. An example of a glass of an aluminosilicate composition suitable for use as the first glass sheet 10 is Gorilla® Glass, which is manufactured and sold by Corning Incorporated.

The first glass sheet 10 may have a thickness between 0.5-25 millimeters (mm), typically a thickness between 0.5-8 mm. When the first glass sheet 10 is sufficiently thin, it may be desirable that the first glass sheet 10 is chemically strengthened. An example of a suitable chemically strengthened aluminosilicate glass is the aforementioned Gorilla® Glass. A preferred chemically strengthened glass having a soda-lime-silicate glass composition is glanova™, which is manufactured and sold by Nippon Sheet Glass Co. Ltd. Other chemically strengthened glasses are also suitable for use as the first glass sheet 10.

The shape of the first glass sheet 10 may vary between embodiments. In certain embodiments, the first glass sheet 10 may have a generally rectangular shape. The first glass sheet 10 has a first major surface 14 and a second major surface 16. The second major surface 16 opposes the first major surface 14. Also, the first glass sheet 10 comprises an edge portion 18. The edge portion 18 can be flat or curved. The edge portion includes one or more portions of the first glass sheet 10 disposed between the first major surface 14 and the second major surface 16. The first glass sheet 10 also comprises a peripheral edge 20. In an embodiment, the peripheral edge 20 is a minor surface of the first glass sheet 10 that connects the first major surface 14 to the second major surface 16.

The edge portion 18 may comprise one or more portions. In an embodiment, the edge portion 18 may comprise a first edge portion and a second edge portion. The first edge portion may refer to a leading edge portion or a trailing edge portion of the first glass sheet 10. Alternatively, the first edge portion may refer to a first pillar edge portion or a second pillar edge portion of the first glass sheet 10. The second edge portion may also refer to the leading edge portion or the trailing edge portion. For example, when the first edge portion refers to leading edge portion, the second edge portion may refer to the trailing edge portion. Alternatively, the second edge portion may refer to the first pillar edge portion or the second pillar edge portion. Thus, as an example, when the first edge portion refers to leading edge portion or the trailing edge portion, the second edge portion may refer to the first pillar edge portion or the second pillar edge portion. In the embodiments described above, the leading edge portion and the trailing edge portion are disposed on opposite ends of the first glass sheet 10. The first pillar edge portion and second pillar edge portion are disposed on opposite sides of the first glass sheet 10. In some embodiments, the edge portion 18 of the first glass sheet 10 may comprise the first edge portion, the second edge portion, a third edge portion, and a fourth edge portion.

Preferably, the first glass sheet 10 is shaped utilizing one or more tools 32, 96. After shaping, the first glass sheet 10 may be generally flat or bent. An example of a suitable glass shaping process will be described with reference to FIG. 1, which illustrates an embodiment of a glass shaping line 22. In certain embodiments, the glass shaping line 22 is of the press bending variety. In other embodiments (not depicted), the glass shaping line may be of the gravity bending variety.

The glass shaping line 22 may include a preheating furnace 24. The preheating furnace 24 serves to heat the first glass sheet 10 before shaping of the first glass sheet 10 occurs. In the preheating furnace 24, the first glass sheet 10 is heated to a temperature suitable for shaping. For example, the first glass sheet 10 may be heated to a temperature of 590-670° C. Accordingly, the first glass sheet 10 may also be referred to as a heated glass sheet.

The first glass sheet 10 may be transported through the preheating furnace 24 on rollers 26. When provided, the rollers 26 are spaced apart. The spacing of the rollers 26 is reduced near the exit of the preheating furnace 24, since the first glass sheet 10 in the heated state is deformable and therefore requires greater support.

The preheating furnace 24 is followed by a bending station 28. The bending station 28 may include a stopping device 30. The stopping device 30 is used to prevent the first glass sheet 10 from moving beyond the bending station 28 before it is deposited on a first bending tool 32. The bending station 28 may also include a plurality of moveable rollers 34. However, it should be appreciated that the bending station 28 may comprise an alternative mechanism for transporting and transferring the first glass sheet 10. In the embodiments illustrated, the first glass sheet 10 is transported onto the moveable rollers 34 from the rollers 26 in the preheating furnace 24 as soon as the first glass sheet 10 exits the preheating furnace 24. After being transported onto the plurality of moveable rollers 34, the first glass sheet 10 continues to move in the direction of glass travel. The moveable rollers 34 may be moved vertically to facilitate depositing and positioning the first glass sheet 10 on the first bending tool 32. After the first glass sheet 10 has been shaped, the moveable rollers 34 may be moved in an upward direction to lift the shaped glass sheet off of the bending tool 32. An air lift assembly (not depicted) may be provided at the bending station. When provided, the air lift assembly helps to eliminate optical distortion caused by roller marks by facilitating positioning of a glass sheet on the first bending tool and transferring the glass sheet from the moveable rollers to the bending tool. Once the first glass sheet 10 has been deposited on the first bending tool 32 and prior to being shaped, the position of the first glass sheet 10 may be adjusted utilizing one or more positioning assemblies (not depicted).

In some embodiments, the first glass sheet 10 is shaped on the first bending tool 32. The first bending tool 32 may be a female tool. In an embodiment, the first bending tool 32 is a ring-type mold. As illustrated best in FIG. 2, the first bending tool 32 may have a generally rectangular outline or periphery configured to support a glass sheet also having a rectangular outline.

The first bending tool 32 comprises a shaping surface 36, in particular a concave shaping surface. As used herein, the shaping surface 36 of the first bending tool 32 refers to the portion of the first bending tool 32 that the glass sheet is deposited on and any position, configuration, or orientation thereof. More particularly, the first bending tool 32 comprises an upper shaping surface 36 for shaping and supporting the glass sheet thereon. After the first glass sheet 10 has been received by the first bending tool 32, the first glass sheet 10 is supported on the shaping surface 36. The shaping surface 36 may be configured to support the first glass sheet 10 in a peripheral region thereof. The first bending tool 32 may also support a stack of glass sheets thereon, in particular a nested pair separated by a suitable parting agent such as calcium carbonate.

After the first glass sheet 10 is deposited on the first bending tool 32, the edge portion 18 of the first glass sheet 10 is disposed over the shaping surface 36 of the first bending tool 32. In this position, the edge portion 18 of the first glass sheet 10 is in contact with the shaping surface 36 of the first bending tool 32. As used herein, the edge portion 18 of the first glass sheet 10 refers to the portion(s) of the first glass sheet 10 which are disposed over and in contact with the shaping surface 36 of the first bending tool 32.

During contact with the shaping tool(s) 32, 96, a temperature distribution is established in the first glass sheet 10. As the first glass sheet 10 subsequently cools, stresses are generated in the sheet material as a result of these temperature differentials. One component of this stress field may be referred to as "area" or "regional" stress. The area stress may be viewed or measured using techniques known to a person skilled in the art using a suitable polariscope or measured with, for example, a Sharples S-69 Edge Stress Meter in reflection, which is available from Sharples Stress Engineers Ltd, Unit 29 Old Mill Industrial Estate, School Lane, Bamber Bridge, Preston, Lancashire, PR5 6SY UK (http://www.sharplessstress.com/edgestress.htm). Area stress measurements may also be made in transmission if no obscuration band (or the like) is on one or more of the glass surfaces being measured.

As the edge portion 18 of the first glass sheet 10 is in contact with the shaping surface 36 of the first bending tool 32 and, preferably, the shaping surface 98 of a second bending tool 96, the edge portion will cool faster than other portions 38, 40 of the first glass sheet 10, which are not in contact with the shaping surface 36 during shaping. Cooling the edge portion 18 of the first glass sheet 10 faster than other portions 38, 40 of the first glass sheet 10 allows a compression area 42 to be formed in the edge portion 18. After shaping, the first glass sheet 10 also includes a tension area 44 and a transition 46 in the first glass sheet.

The compression area 42, tension area 44, and transition 46 can each be characterized by forces acting on the first glass sheet 10. In the compression area 42, compressive area stress is formed. In some embodiments, a compressive area stress of 20-100 MPa is exhibited in the compression area 42. Preferably, a compressive area stress of 20-50 MPa is exhibited in the compression area 42. Due to conservation of energy, a balancing region of tensile area stress is formed in the tension area 44. Preferably, a tensile area stress of less than 8 MPa is exhibited in the tension area 44. The transition is formed between the compression area 42 and the tension area 44. The transition is a line of zero area stress formed in the first glass sheet and between the compression area 42 and the tension area 44. In the transition 46, an area stress equal to 0 MPa is exhibited.

The compression area 42 is formed in the edge portion 18 of the first glass sheet 10. The compression area 42 corresponds to the portions of the shaping surface 36 that the first glass sheet 10 is disposed over and in contact with. Thus, the shaping surface 36 of the first bending tool 32 can utilized to define the position, size, and shape of one or more portions 48, 50 of the compression area 42.

The transition 46 is formed in another portion 38 of the first glass sheet 10. This portion 38 of the first glass sheet 10 is adjacent the edge portion 18 of the first glass sheet 10 and is disposed over but not in contact with the first bending tool 32 during shaping. Hence, the configuration of the shaping surface 36 of the first bending tool 32 can be utilized to provide the transition 46 in a predetermined location. As will be described in more detail below, an outer perimeter 52 of shaping surface 36 of the first bending tool 32 is not covered by the first glass sheet 10.

Preferably, the compression area 42 comprises a first portion 48 and a second portion 50. The first portion 48 has a width $W_1$ which is greater than a width $W_2$ of a second portion 50. The width $W_1$ of the first portion 48 is measured normal to the peripheral edge 20 of the first glass sheet 10 inward toward the portion of transition 46 adjacent the inner end of the first portion 48. Similarly, the width $W_2$ of the second portion 50 is measured normal to the peripheral edge of the first glass sheet 10 inward toward the portion of transition 34 adjacent the inner end of the second portion 50. As used to describe measuring the width $W_1$ of the first portion 48 and the width $W_2$ of the second portion 50, normal means relative to a tangent on the peripheral edge of the first glass sheet. Additionally, it is preferred that the width $W_1$ of the first portion 48 is greater than a width of the portion of the transition 46 adjacent the inner end of the first portion 48.

The width $W_1$ of the first portion 48 may be 5 mm of more. In some embodiments, the width $W_1$ of the first portion 48 is 12.5 mm or more. In one such embodiment, the width $W_1$ of the first portion 48 is 12.5-100 mm. In another embodiment, the width $W_1$ of the first portion 48 is 12.5-75 mm. In these embodiments, it may be preferred that the width of the first portion 48 is 12.5-50 mm. More preferably, the width $W_1$ of the first portion 48 may be 12.5-25.4 mm. The width $W_2$ of the second portion 50 may be 2.5 mm of more. In an embodiment, the width $W_2$ of the second portion 50 is 5 mm or more. In other embodiments, the width $W_2$ of the second portion 50 is 12.5 mm or more. In one such embodiment, the width $W_2$ of the second portion 50 is 12.5-100 mm. In another embodiment, the width $W_2$ of the second portion 50 is 12.5-75 mm. In these embodiments, it may be preferred that the width $W_2$ of the second portion 50 is 12.5-50 mm. More preferably, the width $W_2$ of the second portion 50 is 12.5-25.4 mm. Even more preferably, the width $W_2$ of the second portion 50 is 12.5-20 mm.

The shaping surface 36 is utilized to form the first portion 48 and the second portion 50. As the first portion 48 has a width $W_1$ which is greater than a width $W_2$ of the second portion 50, the shaping surface 36 of the first bending tool 32 can be utilized to define the width $W_1$ of the first portion 48 and the width $W_2$ of the second portion 50. Also, the shaping surface 36 of the first bending tool 32 can be utilized to provide the compression area 42 or a portion thereof with a desired shape. For example, the shaping surface 36 of the first bending tool 32 can be utilized to provide the compression area 42 with a generally rectangular outline or another outline of a regular shape. Alternatively, the shaping surface 36 of the first bending tool 32 can be utilized to provide the compression area 42 with an outline of an irregular shape. The shaping surface 36 can be also be utilized to form the first portion 48 in a first edge portion 54 and the second portion 50 in a second edge portion 56 or the first portion 48 and the second portion 50 in a first edge portion 54.

Figure 2:
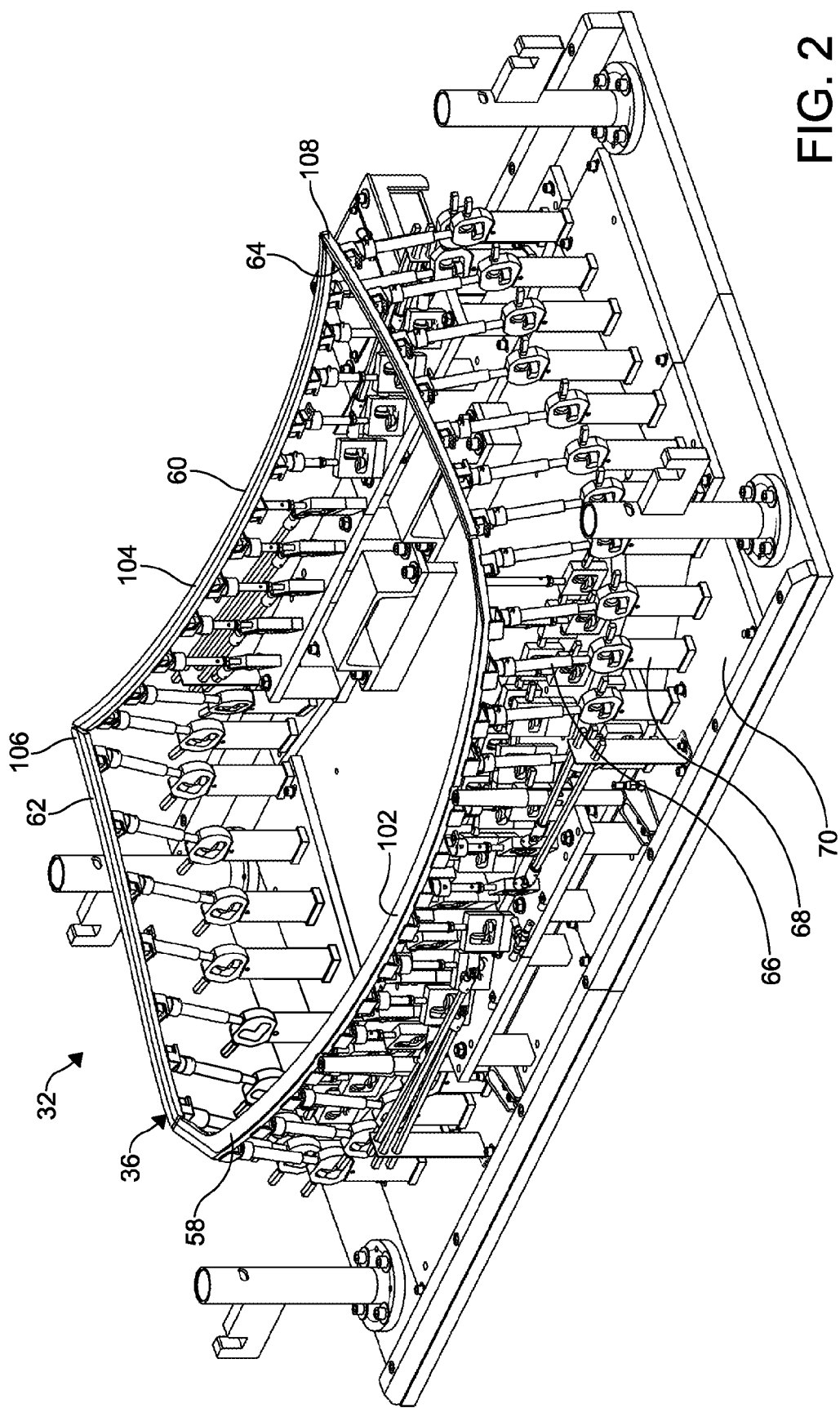
FIG. 2 is a perspective view of an embodiment of a portion of a first bending tool suitable for use the glass shaping line of FIG. 1.
Figure 4:
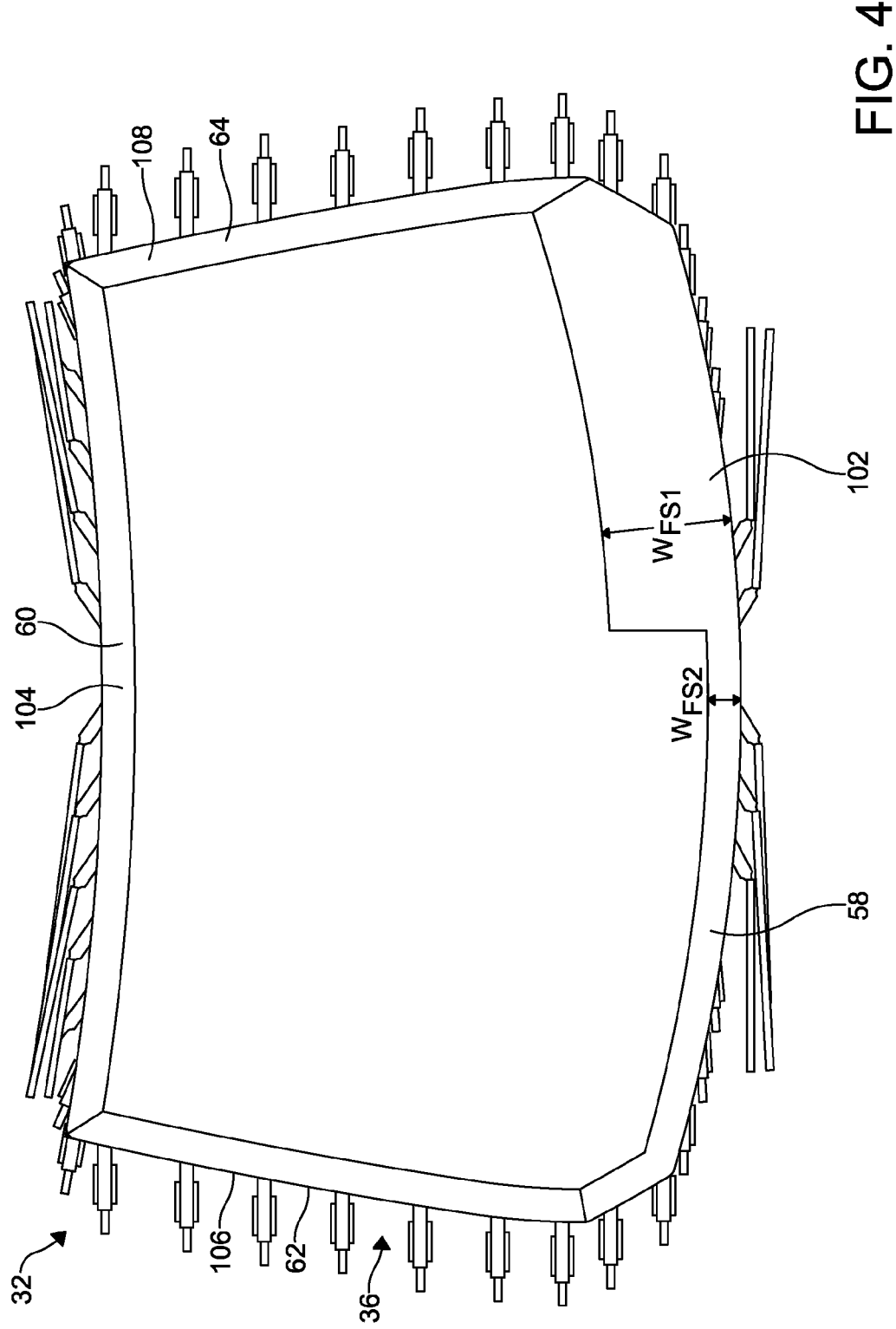
FIG. 4 is a top view of another embodiment of a portion of a first bending tool suitable for use the glass shaping line of FIG. 1.
Figure 5A:
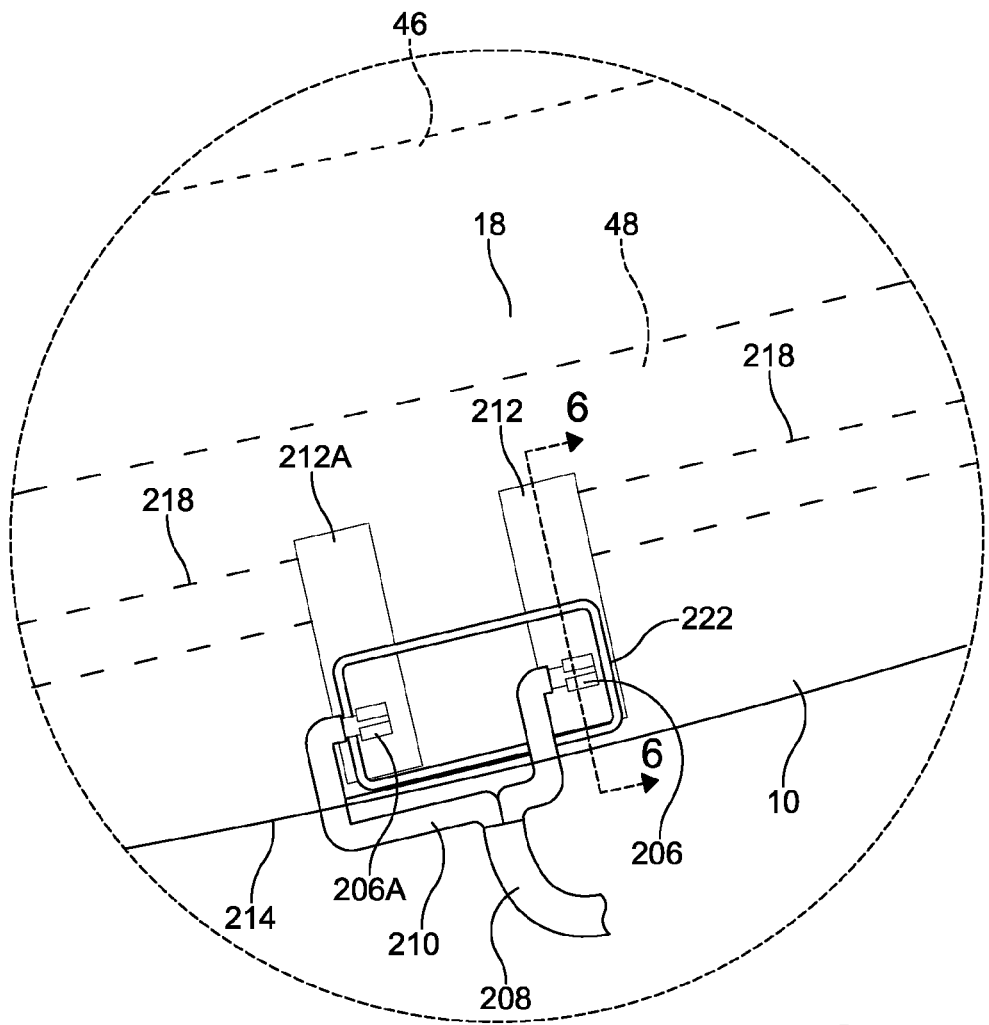
FIG. 5A is an enlarged view of a portion of the glass article of FIG. 5.

In certain embodiments, like the ones illustrated in FIGS. 2 and 4, the shaping surface 36 is at least partially defined by a first segment 58. In some embodiments, the shaping surface 36 of the first bending tool 32 is at least partially defined by a second segment 60. The first segment 58 is spaced apart from the second segment 60. In the embodiments described and illustrated, the first segment 58 will be described and depicted as being configured to receive the trailing edge portion of the first glass sheet 10. However, it should be appreciated that the first segment 58 could refer to a segment that is configured to receive the leading edge portion of the first glass sheet 10 or a pillar edge portion of the first glass sheet 10. Once a particular edge portion of the first glass sheet 10 is received, the first segment 58 is configured to support the edge portion of the first glass sheet 10. Preferably, the portion of the shaping surface 36 defined by the first segment 58 is formed in a unitary manner. Additionally, in certain embodiments, the second segment 60 will be described and depicted as being configured to receive the leading edge portion of the first glass sheet 10. However, it should be appreciated that the second segment 60 could be configured to receive the trailing edge portion of the first glass sheet 10 or a pillar edge portion of the first glass sheet 10. Once a particular edge portion of the first glass sheet 10 is received, the second segment 60 is configured to support the edge portion of the first glass sheet 10. Preferably, the portion of the shaping surface 36 defined by the second segment 60 is formed in a unitary manner.

Positioned at one end of the first segment 58 and the second segment 60 is a third segment 62. More particularly, a first end of the third segment 62 is spaced apart from a first end of the first segment 58 and a second end of the third segment 62 is spaced apart from a first end of the second segment 60. When provided, the third segment 62 at least partially defines the shaping surface 36 of the first bending tool 32. Preferably, the portion of the shaping surface 36 defined by the first segment 98 is formed in a unitary manner. In certain embodiments, the third segment 62 is configured to receive a pillar edge portion of the first glass sheet 10. In these embodiments, once a particular edge portion of the first glass sheet 10 is received, the third segment 62 is configured to support the edge portion of the first glass sheet 10.

Positioned at another end of the first segment 58 and the second segment 60 is a fourth segment 64. More particularly, a first end of the fourth segment 64 is spaced apart from a second end of the first segment 58 and a second end of the fourth segment 64 is spaced apart from a second end of the second segment 60. When provided, the fourth segment 64 at least partially defines the shaping surface 36 of the first bending tool 32. Preferably, the portion of the shaping surface 36 defined by the fourth segment 64 is formed in a unitary manner. In certain embodiments, the fourth segment 64 is configured to receive a pillar edge portion of the first glass sheet 10. In these embodiments, once a particular edge portion of the first glass sheet 10 is received, the fourth segment 64 is configured to support the edge portion of the glass sheet 10.

As illustrated in FIGS. 2 and 4, when provided, the first segment, second segment, third segment, and fourth segment may each define a discrete portion of the shaping surface 36 of the first bending tool 32. When the first glass sheet 10 is supported on the shaping surface 36, the first glass sheet 10 is disposed over the first segment 58, second segment 60, third segment 62, and fourth segment 64. A portion of the compression area 42 may be formed over each segment 58-64. For example, in an embodiment, the first portion 48 of the compression area 42 may be formed over the first segment 58. In these embodiments, the second portion 36 of the compression area 42 may be formed over the first segment 58, the second segment 60, or another segment 62, 64.

In combination, the segments 58-64 may define the generally rectangular outline. In certain embodiments, the first segment 58, second segment 60, third segment 62, and fourth segment 64 are configured as a ring which supports the first glass sheet 10 in a peripheral region thereof. However, the shaping surface 36 may have other configurations. For example, in an embodiment, the first segment 58 may not be provided in a parallel relationship with the second segment 60. In other embodiments, the third segment 62 may not be provided in a parallel relationship with the fourth segment 64. In still other embodiments, the outline of the shaping surface 36 may be trapezoidal or have other forms suitably configured to support the particular glass sheet to be shaped. Also, as is illustrated in FIG. 2, one or more of the segments 58-64 may comprise one or more curved portions.

The position of a segment 58-64 is regulated in a vertical direction by increasing or decreasing the length of the one or more supports 66 that are attached to the segment 58-64. As illustrated best in FIG. 2, each support 66 is attached to a particular segment 58-64 and, on an opposite end, each support 66 is attached to a base member 68. On an end, each base member 68 is attached to a support 66 and, on an opposite end, each base member 68 is attached to a frame 70.

It should also be noted that FIG. 1 illustrates a direction of glass travel with respect to the first bending tool 32 and the shaping surface 36. In some embodiments, the first bending tool 32 is oriented so that the direction of glass travel has the trailing edge portion of the first glass sheet 10 being received by the first segment 58. It should be appreciated that the first bending tool 32 and the shaping surface 36 could be oriented in another manner with respect to the direction of glass travel so that the trailing edge portion of the glass sheet 10 is received by another segment 60-64. For example, in another embodiment (not depicted), first bending tool may be oriented at 180 degrees with respect to the embodiment described above. In this embodiment, the first bending tool is oriented with respect to the direction of glass travel so that the second segment receives the trailing edge portion of the first glass sheet.

Figure 3:
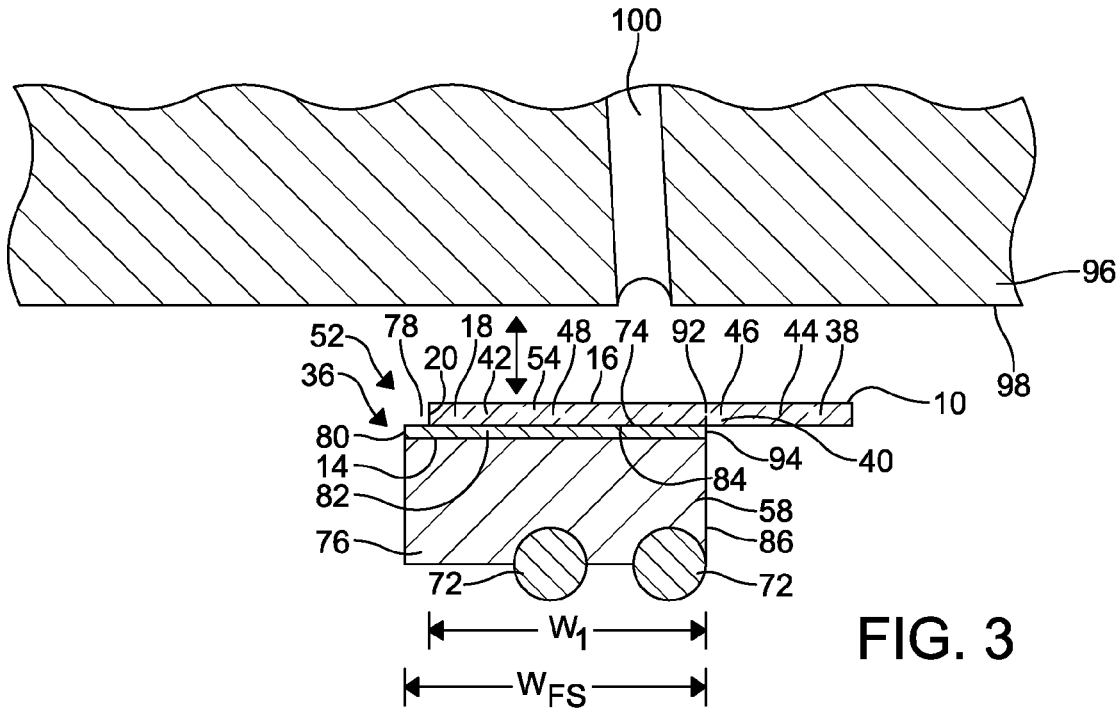
FIG. 3 is a sectional view through a portion of an embodiment of the first bending tool and a portion of an embodiment of a second bending tool.
Figure 3A:
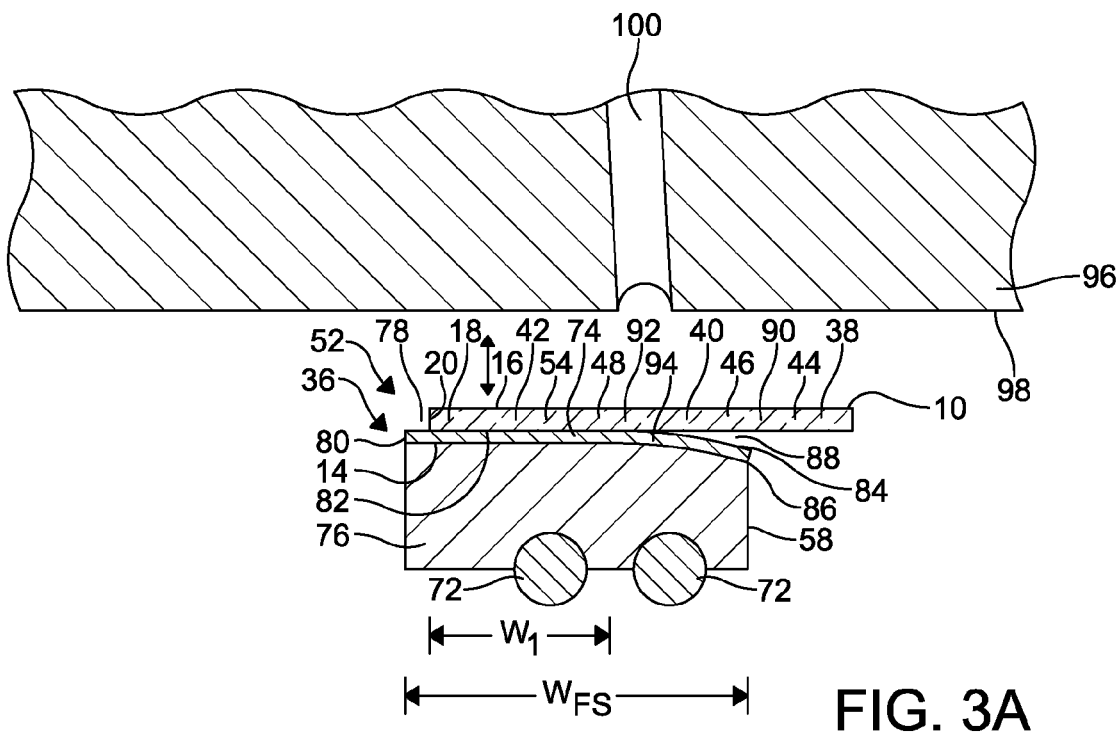
FIG. 3A is a sectional view through a portion of another embodiment of the first bending tool and a portion of an embodiment of a second bending tool.

With reference to FIGS. 3-3A, which each illustrate a portion of the first segment 58, each segment 58-64 may be in mechanical communication with one or more heating elements 72. The one or more heating elements 72 are utilized to heat the segment 58-64 prior the shaping the first glass sheet 10. Two heating elements 72 may be in mechanical communication with a particular segment 58-64.

Also, each segment 58-64 may comprise a protective cover 74. The protective cover 74 separates a support member 76 of each segment 58-64 from the first glass sheet 10 and makes shaping contact with the first glass sheet 10 when the first glass sheet 10 is being shaped. Preferably, the protective cover 74 comprises a cloth made of, for example, stainless steel, fiber glass, poly-phenyleneterephthalamide fibers (e.g. Kevlar™), materials blended Kevlar™, polybenzoxale (PBO) fibers containing graphite (e.g. Zylon™), or various weaves of these fibers.

Each segment 58-64 has a width. As illustrated, the width of a particular segment is measured normal to an outer edge of the segment to an inner edge of the segment. In some embodiments, like the one illustrated in FIG. 2, the first segment 58 may be configured to have a width which is greater than the width of the second segment 60. In another embodiment, the first segment 58 has a width which is greater than the width of the remaining segments 62, 64. For example, the first segment 58 may have a width which is more than double the width of one or more of the second segment 60, third segment 62, and fourth segment 64. In another embodiment (not depicted), two or more segments such as, for example, the first segment and the second segment or the third segment may each have a width which is greater than a width of one or more of the remaining segments such as, for example, the fourth segment. In these embodiments, the first portion 48 and the second portion 50 of the compression area 42 may be formed over different segments such as, for example, the first segment 58 and the second segment 60. In other embodiments, the first portion 48 and the second portion 50 of the compression area 42 are formed over a single segment such as, for example, the first segment 58. In this embodiment, the first segment 58, which is illustrated in FIG. 4, comprises a first width $W_{FS1}$ and a second width $W_{FS2}$ and the first width $W_{FS1}$ is greater than the second width $W_{FS2}$.

With reference back to FIG. 3, each segment 58-64 may be of a width which allows the first glass sheet 10 to be deposited on the first bending tool 32 and provides a space 78 between the peripheral edge 20 of the first glass sheet 10 and the outer edge 80 of each segment 58-64. For example, when the first portion 48 of the compression area 42 is formed over the first segment 58, the width $W_{FS}$ of the first segment 58 may be greater than the width $W_1$ of the first portion 48 of the compression area 42. Preferably, each space 78 between the peripheral edge 20 of the first glass sheet 10 and the outer edge 80 of each segment 58-64 is equal to the other spaces. In some embodiments, the space 78 between the peripheral edge 20 of the first glass sheet 10 and the outer edge 80 of each segment 58-64 may be 1.5-13 mm. In other embodiments, the space 78 between the peripheral edge 20 of the first glass sheet 10 and the outer edge 80 of each segment 58-64 may be 3.0-6.5 mm. Advantageously, providing a space 78 between the peripheral edge 20 of the first glass sheet 10 and the outer edge 80 of each segment 58-64 allows for tolerance in depositing the first glass sheet 10 on the first bending tool 32.

It should also be noted that the width of each segment 58-64 may be greater than the width of the portion of the compression area 42 formed over the segment 58-64. For example, when the first portion 48 of the compression area 42 is formed over the first segment 58, which is illustrated best in FIGS. 3 and 3A, the width $W_{FS}$ of the first segment 58 is greater than the width $W_1$ of the first portion 48 of the compression area 42. In other embodiments, when, for example, the first portion 48 of the compression area 42 is formed over the first segment 58 and the second portion 50 of the compression area 42 is also formed over the first segment 58, a first width $W_{FS1}$ of the first segment 58 may be greater than the width $W_1$ of the first portion 48 of the compression area 42 and a second width $W_{FS2}$ of the first segment 58 may be greater than the width $W_2$ of the second portion 36 of the compression area 42.

From the outer edge 80, an outer portion 82 of each segment 58-64 extends inward to an inner portion 84. The inner portion 84 extends from the outer portion 82 to an inner edge 86. In certain embodiments, like the one illustrated in FIG. 3A, the inner portion 84 gradually reduces in thickness toward the inner edge 86. In these embodiments, a space 88 separates the portion 40 of the first glass sheet 10 where the transition 46 is formed and the first bending tool 32. It should also be noted that, in the embodiment illustrated in FIG. 3A, the first portion 48 of the compression area 42 is formed over the outer portion 82 of the segment 58 and the transition 46 is formed over the inner portion 84 of the segment 58.

In other embodiments, like the one illustrated in FIG. 3, an inner end 92 of the first portion 48 of the compression area 42 is formed adjacent the inner edge 86 of a segment such as, for example, the first segment 58. In this embodiment, the inner end 92 of the first portion 48 of the compression area 42 is formed over the inner edge 86 of the first segment 58. More particularly, in this embodiment, the inner end 92 of the first portion 48 of the compression area 42 may be aligned with the inner edge 86 of the first segment 58. Further, in this embodiment, the transition 46 is formed in a portion 40 of the first glass sheet 10 which is located inward of the inner edge 86 of the first segment 58.

As illustrated in FIGS. 3 and 3A, the transition 46 between the compression area 42 and the tension area 44 is formed in the first glass sheet 10 inward of an inner edge 94 of the shaping surface 36. Preferably, the transition 46 is formed in the portion 40 of the first glass sheet 10 which is immediately inward of the inner edge 94 of the shaping surface 36 of the first bending tool 32. In these embodiments, each segment such as, for example, the first segment 58 is configured to support an edge portion of the first glass sheet 10 and an inner end of the edge portion is aligned with the inner edge 94 of the shaping surface 36 of the first bending tool 32.

Referring back to FIG. 1, the bending station 28 includes the first bending tool 32 and, in certain embodiments, the second bending tool 96. After the glass sheet 10 is deposited on the first bending tool 32, the first major surface 14 of the glass sheet 10 faces the shaping surface 36 of the first bending tool 32 as is illustrated in FIGS. 3 and 3A. When a second bending tool 96 is provided, the second major surface 16 of the glass sheet 10 faces the shaping surface 98 of the second bending tool 96.

When the first glass sheet 10 is shaped by press bending, the second bending tool 96 may move toward the first glass sheet 10 prior to bending. After the first glass sheet 10 has been shaped, the second bending tool 96 is moved away from the first glass sheet 10. If the first glass sheet 10 is to be press bent, once the first glass sheet 10 is deposited on the shaping surface 36, the first bending tool 32 and the second bending tool 96 begin moving towards one another to press bend the first glass sheet 10. Following movement of the first bending tool 32 and the second bending tool 96, the first glass sheet 10 is press bent between the bending tools 32, 96. Also, in certain embodiments, the first bending tool 32 may move towards the second bending tool 96, with the second bending tool 96 not moving.

The second bending tool 96 may be a male tool. In an embodiment, the second bending tool 96 is and full-face mold. In these embodiments, the second bending tool 96 may comprise a convex shaping surface. Contact between the edge portion 18 of the first glass sheet 10 and the second bending tool 96 also cools the edge portion 18 to form the compression area 42 therein. In certain embodiments, it is preferred that the portions 48, 50 of the compression area 42 are formed in the edge portion 18 of the first glass sheet 10 when the first glass sheet 10 is simultaneously in contact with both the first bending tool 32 and the second bending tool 96.

During pressing, a vacuum may be drawn on passages 100 formed in the second bending tool 96 to facilitate forming the first glass sheet 10 into a desired shape. To assist the second bending tool 96 in holding the first glass sheet 10, an insulation structure (not depicted) may be disposed near the shaping surface 36 of the first bending tool 32. More particularly, the insulation structure may be disposed near the portion 102 of the shaping surface 36 defined by the first segment 58 and the portions 104-108 of the shaping surface 36 defined by one or more additional segments 60-64. The insulation structure helps to prevent heat loss from certain portions of the first glass sheet 10 adjacent the edge portion 18 of the first glass sheet 10. In certain embodiments, the insulation structure is disposed adjacent the first glass sheet 10 where certain portions of the tension area 44 are formed. Preventing heat loss from these portions of the first glass sheet 10 allows for the vacuum to provide a suitable holding force for forming the first glass sheet 10 into a desired shape.

The position of the passages 100 can be determined by the configuration of the second bending tool 96 and the geometry of the first glass sheet 10. Upon completion of shaping, the first glass sheet 10 may be released from the second bending tool 96 by way of positive pressure being applied through the passages 100.

It can be appreciated that the bending station 28 may comprise more than the bending tools 32, 96 illustrated, may be oriented in a position other than the positions shown in FIG. 1, and have bending tools that are stationary. Upon completion of the bending process, a conveying device (not shown) serves to transport the first glass sheet 10 into a lehr 110. In the lehr 110, the first glass sheet 10 may be tempered or annealed as known in the art and cooled to a temperature at which handling can occur.

After being removed from the lehr 100, the first glass sheet 10 may be used in the construction of a glass article 200. The glass article 200 may be utilized as a portion of a window assembly such as, for example, a windshield for a vehicle. However, the glass article 200 may have other vehicular applications. For example, the glass article 200 may be utilized to form a side window, sunroof, or a rear window. Such a window assembly may be monolithic or laminated. The window assembly may be installed in any appropriate body opening of a vehicle. It should be understood by one of ordinary skill in the art that the glass article 200 described herein may have applications to on-highway and off-highway vehicles. Furthermore, it would be understood by one of ordinary skill in the art that the glass article 200 may have architectural, electronic, industrial, locomotive, naval, aerospace, and other applications.

Embodiments of the compression area 42, tension area 44, and transition 46 between compression area 42 and the tension area 44 formed in the first glass sheet 10 will now be described with references to the glass articles 200 illustrated in FIGS. 5-9.

Figure 7:
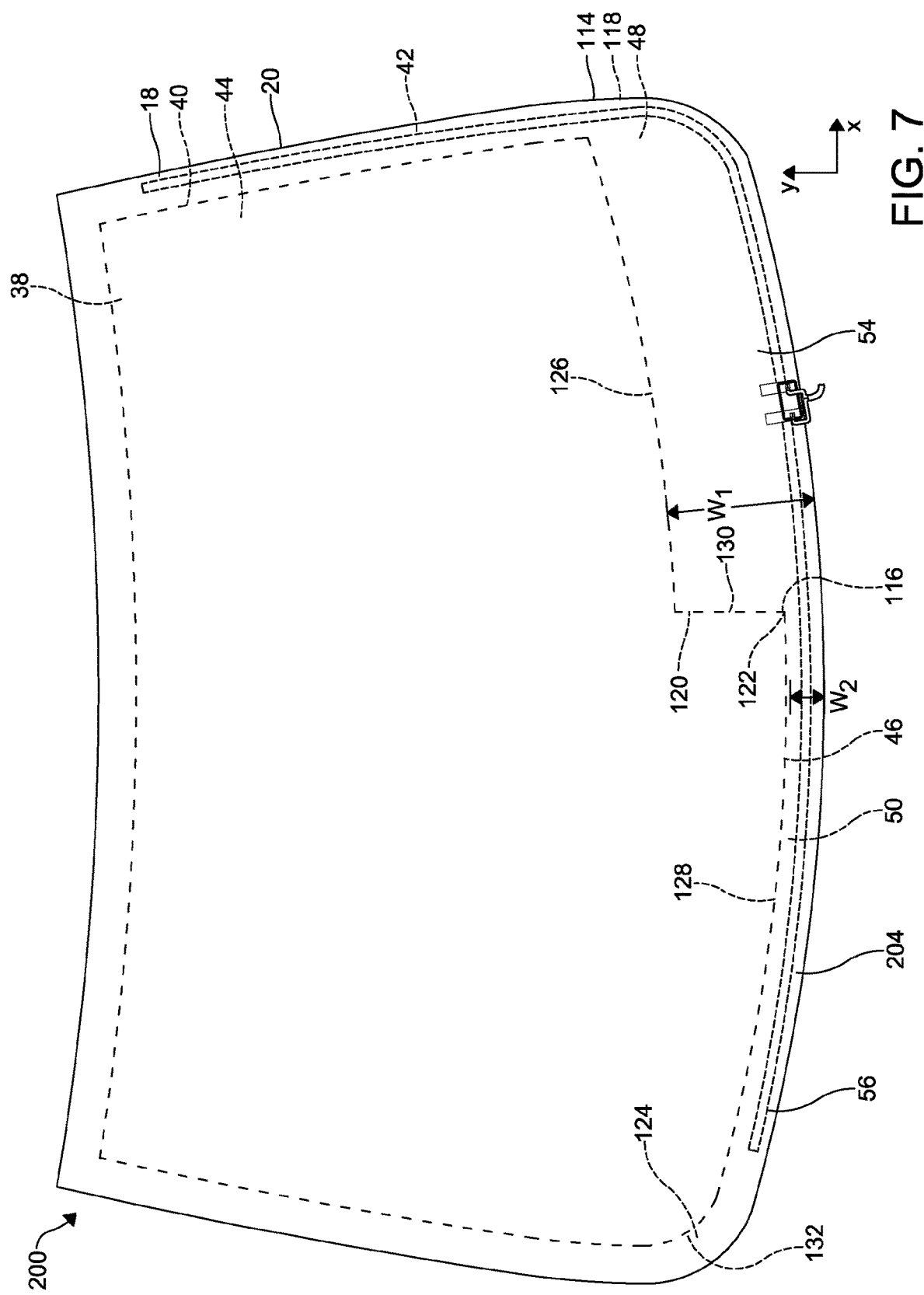
FIG. 7 is a front view of another embodiment of glass article in accordance with the invention.

In certain embodiments, like the ones illustrated in FIGS. 5 and 9, where the edge portion 18 comprises a first edge portion 54 and a second edge portion 56, the first portion 48 may be formed in the first edge portion 54 and the second portion 50 may be formed in the second edge portion 56. In the embodiment illustrated in FIG. 5, the first edge portion 54 may have been the trailing edge portion and the second edge portion 56 may have been the leading edge portion. In this embodiment, the first portion 48 is in a spaced apart relationship with the second portion 50. In other embodiments, like those illustrated in FIGS. 7-8, when the edge portion 18 comprises a first edge portion 54, the first portion 48 and the second portion 50 may each be formed in the first edge portion 54. In still other embodiments, the first portion 48 may be adjacent the second portion 50. For example, as illustrated in FIGS. 7-8, when the first portion 48 and the second portion 50 are each formed in the same edge portion, the first portion 48 may be adjacent the second portion 50. Alternatively, the first portion 48 may be adjacent the second portion 50 when the first portion 48 is formed in the first edge portion 54 and the second portion 50 is formed in the second edge portion 56 as is illustrated in FIG. 9. In this embodiment, the first edge portion 54 may have been the leading edge portion or the trailing edge portion and the second edge portion 56 may have been a pillar edge portion. In another embodiment (not depicted), the first edge portion may have been a pillar edge portion and the second edge portion may have been the leading edge portion or the trailing edge portion.

As illustrated in FIG. 9, when the first portion 48 is formed in a first edge portion 54 and the second portion 50 is formed in a second edge portion 56, the first portion 48 of may extend in a Y direction from a portion 112 of the peripheral edge 20 of the first glass sheet 10 to the second portion 50. Also, and with reference back to the embodiment illustrated in FIG. 7, when the first portion 48 and the second portion 50 are each be formed in a first edge portion 54, the first portion 48 may extend in an X direction from another portion 114 of the peripheral edge 20 of the first glass sheet 10 to the second portion 50. In these embodiments, a transition 116 from the first portion 48 to the second portion 50 may be sharply defined.

With reference to FIG. 7, the width $W_1$ of the first portion 48 may be constant in an X direction toward a first end 118 of the first portion 48 or toward a second end 120 of the first portion 48. Alternatively, in certain embodiments like the one illustrated in FIG. 8, the width $W_1$ of the first portion 48 may gradually increase in an X direction toward the first end 118 or the second end 120 of the first portion 48. In the embodiments described above and as illustrated in FIG. 7, the width $W_2$ of the second portion 50 may be constant in a direction toward a first end 122 of the second portion 50. In certain embodiments, the width $W_2$ of the second portion 50 may be constant from the first end 122 to a second end 124 of the second portion 50.

The tension area 44 is surrounded by the compression area 42. The tension area 44 is formed in a second portion 38 of the first glass sheet 10. The second portion 38 of the first glass sheet 10 is located inward of the edge portion 18 of the first glass sheet 10. Thus, the tension area 44 is provided inward of the compression area 42.

As noted above, the transition 46 is provided between the compression area 42 and the tension area 44. The transition 46 is formed in a third portion 40 of the first glass sheet 10. The third portion 40 of the first glass sheet 10 is positioned between the edge portion 18 of the first glass sheet 10 and the second portion 38 of the first glass sheet 10. The third portion 40 of the first glass sheet 10 is adjacent the edge portion 18 of the first glass sheet 10. In this location, the compression area 42 surrounds the transition 46. The third portion 40 of the first glass sheet 10 is also adjacent the second portion 38 of the first glass sheet 10. In this location, the transition 46 surrounds the tension area 44.

In certain embodiments, the transition 46 comprises a first portion 126. The first portion 126 extends from the edge portion 18 of the first glass sheet 10. The first portion 126 may extend from the edge portion 18 of the first glass sheet 10 in an X direction and/or Y direction. The transition 46 may also comprise a second portion 128. The second portion 128 may be provided in a parallel relationship with the first portion 126. In some embodiments, the second portion 128 extends from the edge portion 18 of the first glass sheet 10 in an X direction and/or Y direction.

Further, the transition 46 may comprise a third portion 130. The third portion 130 may connect the first portion 126 to the second portion 128. When the third portion 130 connects the first portion 126 to the second portion 128, the third portion 130 may be provided in a perpendicular relationship with the first portion 126 and the second portion 128. In other embodiments, the third portion 130 may connect the first portion 126 to the second portion 128 and be provided in an oblique relationship with the first portion 126 and the second portion 128. In embodiments where the third portion 130 connects the first portion 126 to the second portion 128, the third portion 130 may extend in a Y direction. As is illustrated in FIG. 5, the third portion 130 may extend in a Y direction from an edge portion 18 of the first glass sheet 10. Alternatively, as is illustrated in FIG. 7, the third portion 130 may extend in a Y direction from the first portion 126 to the second portion 128 or vice versa.

As illustrated in, for example, FIG. 7, the transition 46 may comprise a linear portion. In this embodiment, the first portion 126, second portion 128, and third portion 130 may be linear. In other embodiments, like the one illustrated in FIG. 8, the transition 46 may comprise a curved portion such as, for example, the first portion 126. As illustrated in FIG. 5, a junction 132 connecting the first portion 126 and the third portion 130 may be sharply defined. In other embodiments, like the one illustrated in FIG. 7, a junction 132 connecting the portions of the transition 46 may be curved. Also, the junction connecting the second portion 128 and the third portion 130 may be sharply defined or, in other embodiments (not depicted), the junction connecting the second portion 128 and the third portion 130 may be curved.

Under certain conditions, it is desirable to increase the width of a portion of the compression area 42. For example, when it is desired to provide an electrical component such as, for example, a terminal connector in mechanical communication with the first glass sheet 10 via a solder process or another method, it may be desirable to increase the width of a portion of the compression area 42. When the width is not increased, the electrical component may be positioned directly over the tension area 44, transition 46, or another portion of the first glass sheet 10 that has tensile area stress. Providing the electrical component in mechanical communication with the first glass sheet 10 over the tension area 44, transition 46 or another portion of the first glass sheet 10 that has tensile area stress may result in weakening and failure of the first glass sheet 10. Advantageously, the embodiments described herein allow the width of a portion of the compression area 42 to be increased so that the other portions of the first glass sheet 10 that have tensile area stress are provided in a predetermined location. For example, the width of a portion of the compression area 42 can be increased by utilizing an appropriately configured bending tool 32, 96 so that the location of the transition 46, the tension area 44, and other portions of the first glass sheet 10 that have tensile area stress are inward of the position of the electrical component.

When it is desired to utilize the glass article 200 as a windshield, the first glass sheet 10 may be laminated to a second glass sheet 12 to form the glass article 200. The first glass sheet 10 and the second glass sheet 12 may be similarly configured and utilized in the method in similar manners. It should be appreciated that the properties described in relation to the first glass sheet 10 could also be exhibited by the second glass sheet 12. However, in certain embodiments, the first glass sheet 10 and the second glass sheet 12 may have different configurations or be utilized in the method in different manners.

When the first glass sheet 10 is to be laminated to a second glass sheet 12, a polymeric interlayer 202 is provided between the first glass sheet 10 and the second glass sheet 12. As illustrated best in, for example, FIG. 6, the first glass sheet 10 is depicted as the inner pane of glass and the second glass sheet 12 is depicted as the outer pane of glass. However, it should be appreciated that, in other embodiments, the first glass sheet 10 may be the outer pane of glass and the second glass sheet 12 may be the inner pane of glass.

Preferably, the polymeric interlayer 202 is clear and substantially transparent to visible light. Optionally, the polymeric interlayer 202 can be tinted and/or comprise an IR reflective film to provide additional solar control features. The polymeric interlayer 202 is of or includes a suitable polymer such as, for example, polyvinyl butyral (PVB) or another polymer. In certain embodiments like those shown in FIG. 6, the polymeric interlayer 202 is provided as a sheet of material in a shape substantially matched to that of the first glass sheet 10 and the second glass sheet 12. In other embodiments (not depicted), the polymeric interlayer is provided in a shape substantially matched to that of the first glass sheet or the second glass sheet.

The polymeric interlayer 202 may be of any suitable thickness. In certain embodiments, the polymeric interlayer 202 has a thickness of between 0.5 and 1.6 mm. Preferably, the polymeric interlayer 202 has a thickness of between 0.6 and 0.9 mm. In these embodiments, a typical thickness of the polymeric interlayer 26 is 0.76 mm.

To form the glass article 200, the first glass sheet 10 and the second glass sheet 12 may be laminated to each other or are otherwise adhered together via the polymeric interlayer 202. Lamination processes known in the art are suitable for adhering the first glass sheet 10 to the second glass sheet 12 via the polymeric interlayer 202 and forming the glass article 200. Generally, such lamination processes will include providing the polymeric interlayer 202 between the first glass sheet 10 and the second glass sheet 12 and subjecting the polymeric interlayer 202 and glass sheets 10, 12 to a predetermined temperature and pressure to create a glass article 200 that is laminated.

Referring back to FIGS. 5 and 7-9, under certain conditions, it may be desirable to heat a portion 204 of the glass article 200 where, for example, wipers rest. Heating this portion 204 of the glass article 200 can prevent the wipers from freezing thereto when the wipers are at rest. The aforementioned portion 204 of the window assembly may also referred to hereinafter as the "wiper rest area." Heating of the wiper rest area 204 can be accomplished by any suitable method. In an embodiment, the wiper rest area 204 is heated by electrical resistance heating.

Electrical resistance heating can be accomplished by providing power to the first glass sheet 10 via an electrical component such as, for example, a terminal connector 206, 206A. The terminal connector 206 may be provided as a portion of a wire assembly 208. Such a wire assembly 208 may be utilized to communicate power from a power supply (not depicted) through a conductive wire 210 to the terminal connector 206, 206A. The wire assembly 208 may comprise a plurality of terminal connectors 206, 206A. However, in describing the embodiments of the glass article 200, only one terminal connector 206, which is in mechanical communication with the first glass sheet 10, will be described below. It should be appreciated that the glass article 200 may comprise two or more terminal connectors 206, 206A in mechanical communication with the first glass sheet 10. For example, as illustrated best in FIG. 5A, a first terminal connector 206 and a second terminal connector 206A may be in mechanical communication with the first glass sheet 10. As illustrated, the second terminal connector 206A is in a spaced apart relationship with the first terminal connector 206. In practice, it is preferred that a terminal connector 206, 206A is provided for each busbar 212, 212A provided on the first glass sheet 10.

Figure 6:
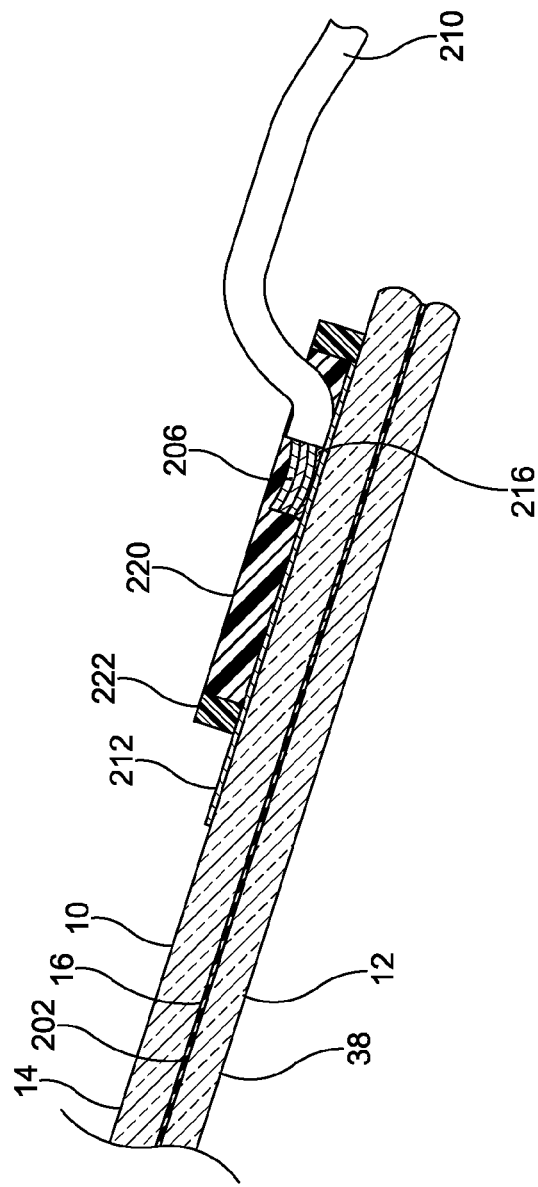
FIG. 6 is a sectional view of the portion of the glass article of FIG. 5A taken along line 6-6.

The first terminal connector 206 is in a spaced apart and parallel relationship with a portion 214 of the peripheral edge 20 of the first glass sheet 10. The first terminal connector 206 is attached to a busbar 212. Preferably, the first terminal connector 206 is attached to the busbar 212 via a solder 216, which is illustrated in FIG. 6. Also, the first terminal connector 206 is in electrical communication with the busbar 212 via the solder 216. Power may be communicated from the power supply through the wire assembly 208, via the conductive wire 210 and the first terminal connector 206, to the busbar 212. From the busbar 212, power is communicated to conductive traces 218 adjacent the wiper rest area 204 to heat the wiper rest area 204 to a desired temperature. The busbar 212 and conductive traces 218 can be formed on either the first major surface 14 or the second major surface 16 of the first glass sheet 10. In the embodiment illustrated in FIGS. 5-6, the busbar 212 and conductive traces 218 are formed on the first major surface 14. Preferably, the busbar 212 and conductive traces 218 are formed on the first glass sheet 10 prior to the first glass sheet 10 being shaped. The busbar 212 and conductive traces 218 may be formed by conventional processes such as deletion, sputtering or silk-screening processes or the like.

Also, as shown in FIG. 6, a potting layer 220 is disposed over the first major surface 14 of the first glass sheet 10. In certain embodiments, the potting layer 220 may be provided over at least each terminal connector 206, 206A, a portion of each busbar 212, 212, and a portion of each conductive wire 210. The potting layer 220 is of a thickness which allows a portion of the potting layer 220 to be disposed over each terminal connector 206, 206A. The potting layer 220 protects the terminal connectors 206, 206A from environmental damage and electrically insulates the terminal connectors 206, 206A. Suitable potting layer materials include acrylics, silicones and urethanes. However, other potting layer materials are suitable for use in forming the window assembly. It should be appreciated that in certain embodiments (not depicted), like, for example, when the glass article is utilized to close a side or rear opening of the vehicle, a potting layer may not be utilized.

A retaining member 222 may be utilized to prevent the potting layer material from flowing out of the area where it is desired after it is disposed over the first glass sheet 10 and before it hardens. In order to form the glass article 200, the retaining member 22 is disposed on the first major surface 14 of the first glass sheet 10. In these embodiments, the retaining member 22 may be attached to the first major surface 14 via an adhesive or another method. Preferably, the retaining member 222 is configured to be disposed around each terminal connector 206, 206A provided. Once the potting layer material has been provided over each terminal connector 206, 206A, the potting layer material is contained by the retaining member 222. After the potting material hardens, the retaining member 222 may in remain in place such that the retaining member 222 is disposed around the potting layer 220 or may be removed from the first major surface 14 of the first glass sheet 10 and reused.

As noted above, the first terminal connector 206 is attached to and electrical communication with the busbar 212 via solder 216. Solder compositions known in the art are suitable for use in forming the glass article 200. In certain embodiments, the solder 216 may comprise lead. In other embodiments, the solder 216 is lead-free, i.e. contains no lead. In embodiments where solder is of the lead-free variety, the solder 216 may comprise indium, tin, silver, copper, zinc, bismuth, and mixtures thereof. In certain embodiments where solder is of the lead-free variety, the solder 216 comprises more indium than any other metal component in the solder. In one such embodiment, the solder 216 comprises 65% indium, 30% tin, 4.5% silver, and 0.5% copper. In other embodiments where the solder 216 is of the lead-free variety, another composition may be utilized.

Prior to soldering, the first terminal connector 206 is positioned over a portion of the busbar 212. The portion of the busbar 212 is located over the first portion 48 of the compression area 42. Thus, the first terminal connector 206 is positioned over the first portion 48 of the compression area 42. After positioning, the first terminal connector 206 is attached to the busbar 212 via soldering, or another suitable method, over the first portion 48 of the compression area 42, which is outward from a portion of the tension area 44, the transition 46 and other areas of the first glass sheet 10 having certain tensile area stress. Also, it should be noted that the entire busbar 212 and the conductive traces 218 may be provided over the compression area 42. Providing the entire busbar 212 and the conductive traces 218 over the compression area 42 may also help to maintain the strength and ensure the integrity of the first glass sheet 10.

The glass article 200 may be formed using a soldering method known in the art. However, in certain embodiments, it is preferred that the glass article 200 is formed utilizing a resistance soldering method. More particularly, the first terminal connector 206 may be provided in mechanical communication with the first glass sheet 10 via resistance soldering. Utilizing resistance soldering allows the solder 216 to be heated to a temperature above its melting point, which enables the solder 216 to attach the first terminal connector 206 to the busbar 212. Due heating the solder 216, if the first terminal connector 206 is attached to the busbar 212 in a location which is over the tension area 44, transition 46, or another undesirable portion of the first glass sheet 10 having tensile area stress, then the glass article 200 may exhibit breakage such as spalling. Advantageously, the embodiments described herein help to prevent and eliminate glass breakage and spalling by ensuring that the electrical connector 206, 206A is positioned over the compression area 42.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. A method of forming a glass article, comprising:
   providing a first glass sheet;
   heating the first glass sheet to a temperature suitable for shaping;
   depositing the first glass sheet on a first bending tool, an edge portion of the first glass sheet being disposed over a shaping surface of the first bending tool, the shaping surface of the first bending tool being configured to provide in the first glass sheet a compression area and a tension area; and
   shaping the first glass sheet on the first bending tool and forming the compression area in the edge portion of the first glass sheet, the compression area comprising a first portion and a second portion, the first portion having a width ($W_1$) which is greater than a width ($W_2$) of a second portion, wherein the compression area is formed by cooling the edge portion of the first glass sheet via contact between the edge portion of the first glass sheet and the first bending tool.

2. The method of claim 1, wherein the tension area is formed in a second portion of the first glass sheet which is located inward of the edge portion of the first glass sheet and a transition is formed in a third portion of the first glass sheet.

3. The method of claim 1, further comprising positioning an electrical component over the first portion of the compression area and providing the electrical component in mechanical communication with the first glass sheet via a soldering process.

4. The method of claim 1, further comprising laminating the first glass sheet to a second glass sheet.

5. The method of claim 1, wherein the shaping surface of the first bending tool comprises a first segment and an inner end of the first portion of the compression area is adjacent an inner edge of the first segment such that a transition is formed in a portion of the first glass sheet which is located inward of the inner edge of the first segment.

6. The method of claim 1, wherein the shaping surface of the first bending tool comprises a first segment, the first segment including a first width ($W_{FS}$) which is greater than the width of the first portion of the compression area.

7. The method of claim 1, wherein the width ($W_1$) of the first portion of the compression area is greater than a width of a portion of a transition formed in the first glass sheet inward of the first portion of the compression area.

8. The method of claim 1, further comprising cooling the edge portion of the first glass sheet via contact between the edge portion of the first glass sheet and a second bending tool.

9. The method of claim 1, further comprising forming a transition in a portion of the first glass sheet which is adjacent the edge portion of the first glass sheet, the portion of the first glass sheet being disposed over but not in contact with the first bending tool.

10. The method of claim 1, further comprising forming a transition in a portion of the first glass sheet which is adjacent the edge portion of the first glass sheet, wherein a space separates the portion of the first glass sheet and the first bending tool.

* * * * *